(12) United States Patent
Wang et al.

(10) Patent No.: US 8,979,098 B2
(45) Date of Patent: Mar. 17, 2015

(54) COLLAPSIBLE PLATFORM TRUCK

(71) Applicants: Wen-Fa Wang, Taichung (TW);
Jian-Wen Deng, Yangjiang (CN);
Jia-Chao Chen, Yangjiang (CN)

(72) Inventors: Wen-Fa Wang, Taichung (TW);
Jian-Wen Deng, Yangjiang (CN);
Jia-Chao Chen, Yangjiang (CN)

( * ) Notice: Subject to any disclaimer, the term of this patent is extended or adjusted under 35 U.S.C. 154(b) by 0 days.

(21) Appl. No.: 14/140,561

(22) Filed: Dec. 26, 2013

(65) Prior Publication Data

US 2014/0183832 A1 Jul. 3, 2014

(51) Int. Cl.
*B62B 3/02* (2006.01)

(52) U.S. Cl.
CPC .................................... *B62B 3/022* (2013.01)
USPC ............................................ 280/39; 280/651

(58) Field of Classification Search
USPC ......................................... 280/651, 39, 79.11
See application file for complete search history.

(56) References Cited

U.S. PATENT DOCUMENTS

| | | | | |
|---|---|---|---|---|
| 3,400,942 A | * | 9/1968 | Hull | 280/39 |
| 4,274,644 A | * | 6/1981 | Taylor | 280/39 |
| 4,659,096 A | * | 4/1987 | Leimgruber | 280/39 |
| 5,403,022 A | * | 4/1995 | Snider | 280/30 |
| 6,024,376 A | | 2/2000 | Golichowski et al. | |
| 6,607,207 B2 | * | 8/2003 | Shapiro et al. | 280/287 |
| 6,733,026 B1 | * | 5/2004 | Robberson et al. | 280/415.1 |
| 6,845,991 B1 | * | 1/2005 | Ritucci et al. | 280/30 |
| 7,118,115 B2 | * | 10/2006 | Abel | 280/43.13 |
| 7,264,265 B2 | * | 9/2007 | Shapiro | 280/643 |
| 7,784,816 B2 | * | 8/2010 | Jian | 280/651 |
| 7,806,426 B2 | * | 10/2010 | Van Landingham et al. | 280/651 |
| 7,819,409 B2 | * | 10/2010 | Chang | 280/47.371 |
| 2014/0183832 A1 | * | 7/2014 | Wang et al. | 280/39 |

* cited by examiner

*Primary Examiner* — Jeffrey J Restifo (57) ABSTRACT

A foldable platform truck includes a platform, two wheel-connecting bars rotatably attached to the platform, a handle assembly, a handle release and locking mechanism for controlling the handle assembly, a pair of first gear members and a pair of second gear members. The handle release and locking mechanism has an actuator to be operated to allow the handle assembly to pivot between an upright position and a horizontal position. When the handle assembly is in the horizontal position, the wheels are folded up underneath the platform and lie horizontally with respect thereto. And, when the handle assembly is pulled away from the platform to the upright position, the first gear members engage and turn the second gear members, resulting in the wheel-connecting bars rotating to fold out the wheels from underneath the platform toward an eventual perpendicular position with respect to the underside of the platform.

10 Claims, 9 Drawing Sheets

COLLAPSIBLE PLATFORM TRUCK

BACKGROUND OF THE INVENTION

1. Field of the Invention

The present invention relates to a platform truck utilized to transport items at a home, office, factory, or the like. More particularly, this invention relates to such a collapsible platform truck which is provided with foldable handle and wheels for selectively storing the platform truck.

2. Description of the Related Art

Platform trucks which usually include a generally rectangular, flat, material-supporting surface supported by wheels and a handle for manipulating the truck are well known and have remained essentially unchanged for many years. In most such platform trucks, the handles are permanently positioned in an upright or generally vertical orientation. These prior art trucks cannot be readily stored in a compact environment when not in use primarily because of the upright handle.

One solution to the storage problem involves the folding of the handle down onto the platform, as disclosed in U.S. Pat. No. 6,024,376. Despite the success of the foldable handle, there is still room for improvement.

SUMMARY OF THE INVENTION

It is therefore an object of this invention to provide a collapsible platform truck that is compact and of small size when collapsed so that it can be easily and conveniently transported and stored when not in use while at the same time is strong and stable and, therefore, is able to handle heavy and large loads without being damaged and with ease and assurance.

In general, a platform truck for transporting items made in accordance with the present invention includes a platform, a pair of wheel-connecting bars, a plurality of wheels, a handle assembly, a handle release and locking mechanism, a pair of first gear members and a pair of second gear members. The platform has a top surface to receive the items thereon. The wheel-connecting bars are rotatably attached to a bottom of the platform. The wheels are connected to the wheel-connecting bars. The handle assembly has a pair of lower vertical frame members, a pair of handle arms telescopically attached in the vertical frame members, and a central grip joining the handle arms. The handle release and locking mechanism is disposed in the handle assembly and has an actuator configured to be operated to allow the handle arms together with the central grip to displace with respect to the vertical frame members among a first extended locking position, a second retracted locking position, and a third retracted unlocking position where the handle assembly is unlocked and allowed to pivot between a generally upright position and a generally horizontal position generally flush with a top surface of the platform. The first gear members are connected to the handle assembly. Moreover, the second gear members mesh with the first gear members and are connected to the wheel-connecting bars. By the engagement of the first gear members and the second gear members, the pivotal movement of the handle assembly will cause rotation of the wheel-connecting bars as well as the wheels attached to the latter.

Therefore, when the handle assembly is in the horizontal position, the wheels are folded up underneath the platform and lie horizontally with respect thereto. And, when the handle assembly is pulled away from the platform to the upright position, the first gear members engage and turn the second gear members, resulting in the wheel-connecting bars rotating to fold out the wheels from underneath the platform toward an eventual perpendicular position with respect to the underside of the platform.

Preferably, the handle assembly further has at least one horizontal frame member supporting the vertical frame members; and the actuator is disposed in the middle of the horizontal frame member and is configured to be depressed towards a position that is substantially contiguous with a surface of the horizontal frame member, which unlocks the handle arms so that the handle arms are allowed to be moved among the first extended locking position, the second retracted locking position and the third retracted unlocking position, and upon release, the actuator is restored back to its original position and lock the handle arms in either the first extended locking position or the second retracted locking position.

For a better understanding of the invention, reference may be made to the following description of an exemplary embodiment, taken in conjunction with the following drawings.

DETAILED DESCRIPTION OF EMBODIMENTS

Figure 1:
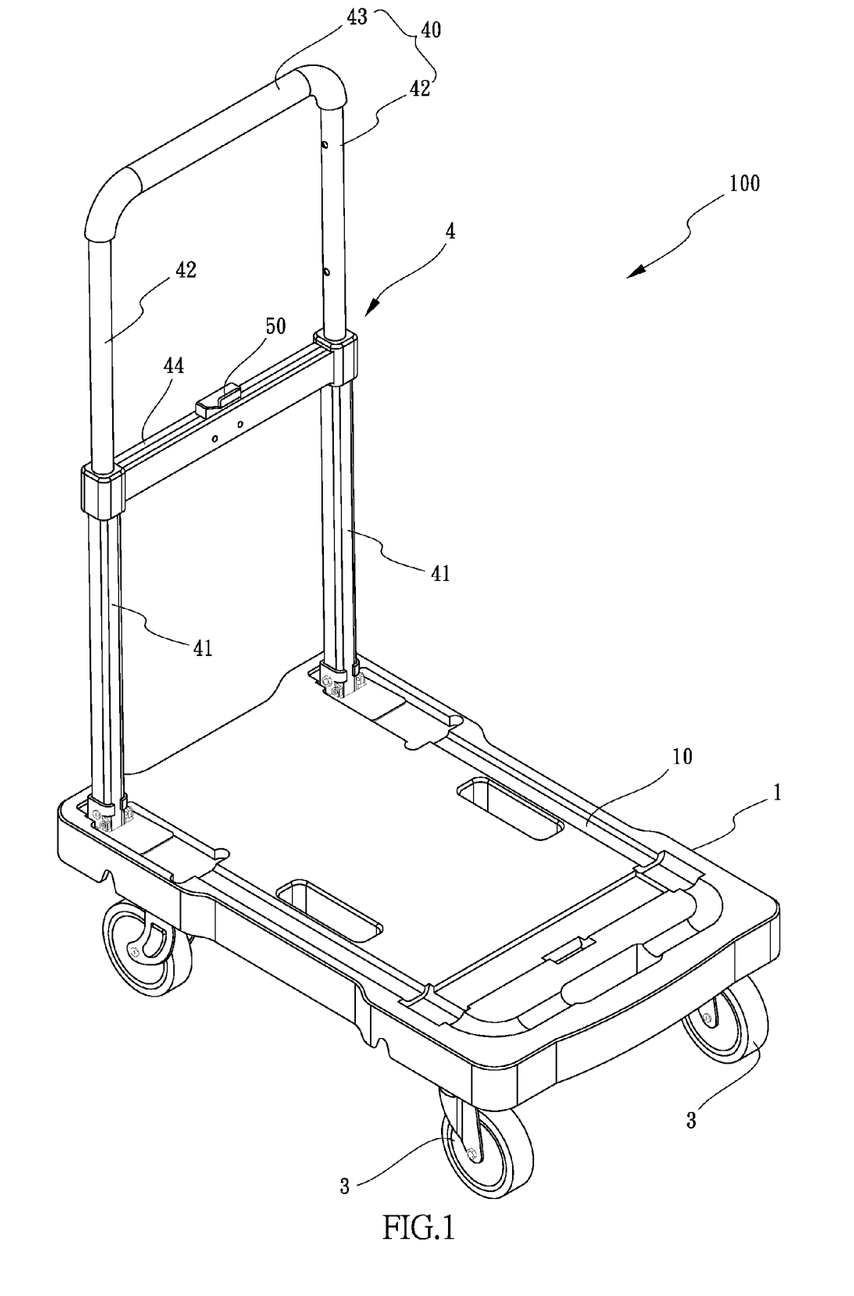
FIG. 1 is a perspective view of a collapsible platform truck in accordance with the invention and showing the handle assembly in its generally upright and extended position which is especially adapted for pushing the platform truck.
Figure 2:
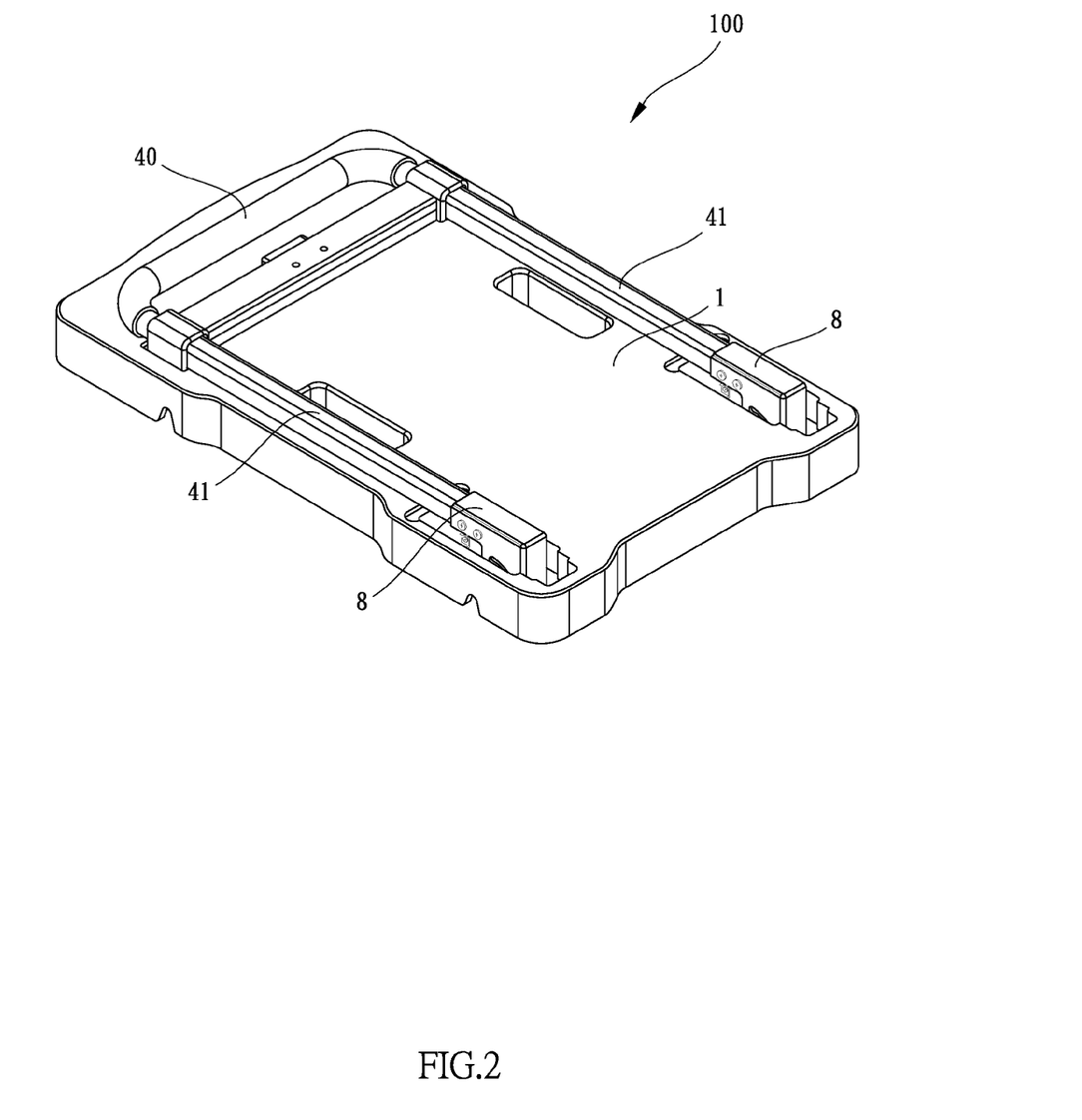
FIG. 2 is a perspective view of the platform truck with the handle assembly having been pivoted to a generally horizontal position for storage and carrying of the platform truck.
Figure 3:
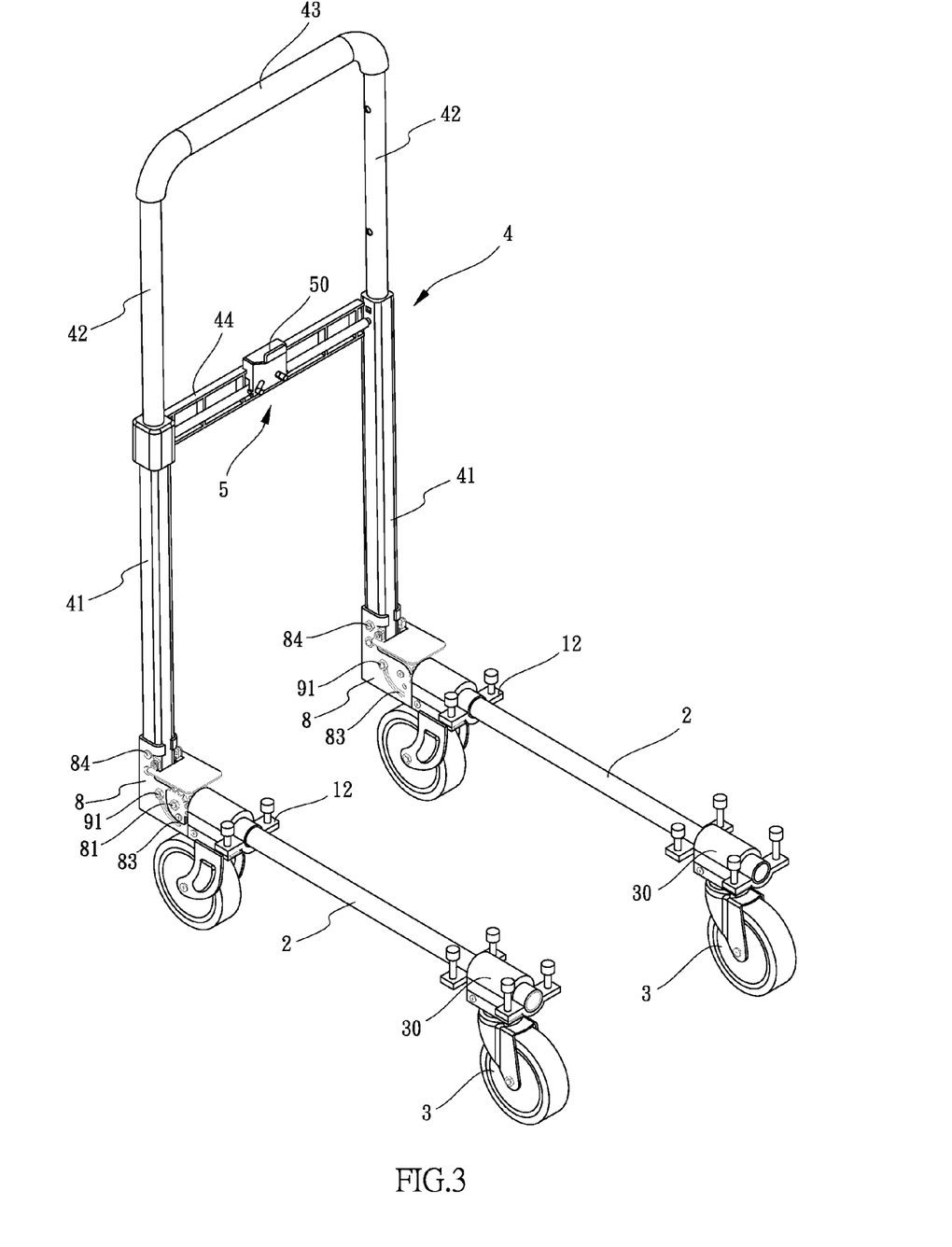
FIG. 3 is a partially perspective view of the platform truck of FIG. 1, with the platform removed to show the detail of the rest components of the platform truck.
Figure 4:
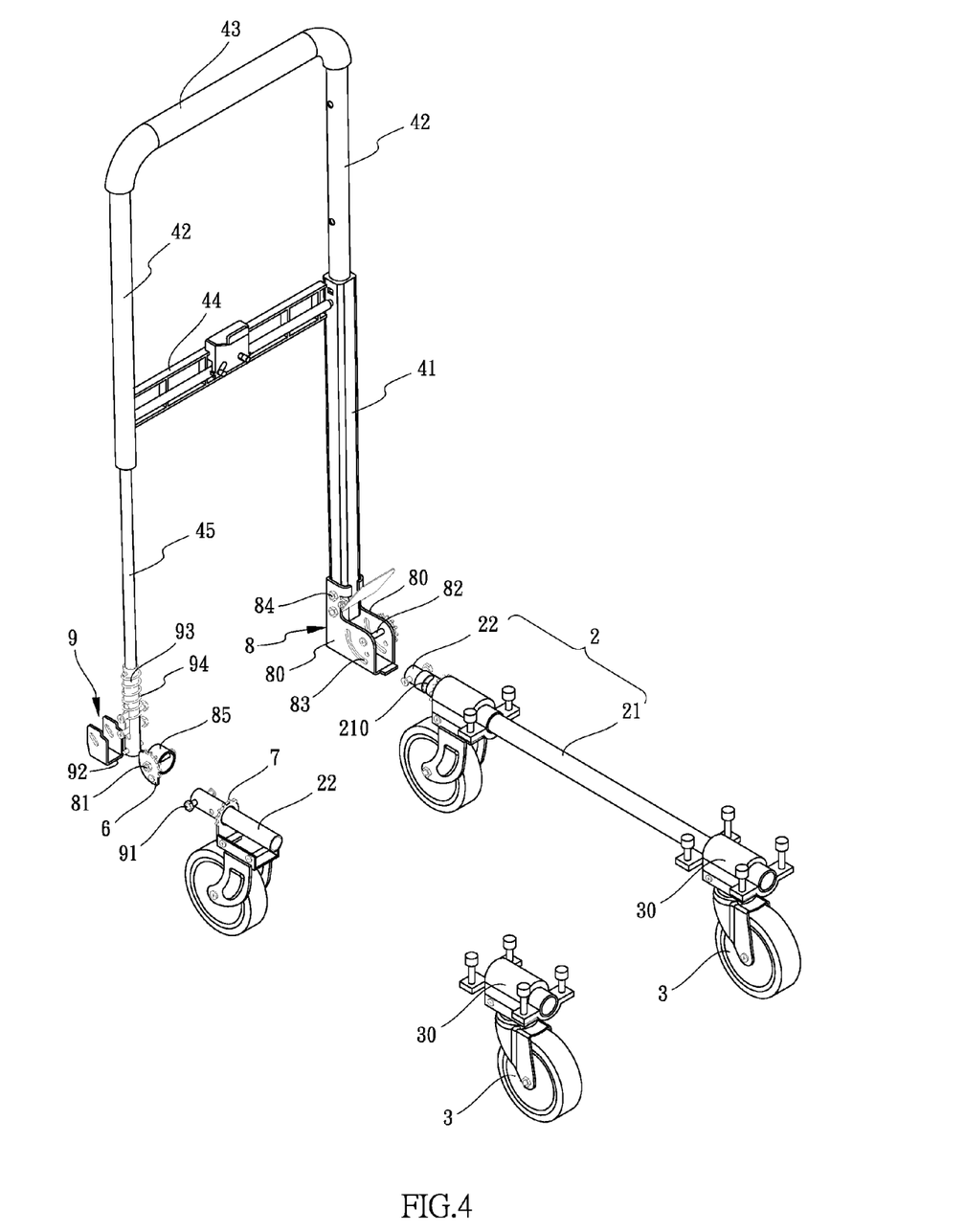
FIG. 4 is an exploded, fragmented perspective view of the platform truck, depicting the configuration of the handle assembly and the manner in which it is assembled to the wheel-connecting rods.

With reference to FIGS. 1-9, a collapsible four-wheeled hand truck or platform truck indicated generally at 100 for transporting items is provided in accordance with the preferred embodiment of the present invention. The platform truck 100 includes a platform 1, a pair of parallel wheel-connecting bars 2 (FIGS. 3-4), four wheels 3, a handle assembly 4, a handle release and locking mechanism 5, a pair of first gear members 6 (FIG. 4) and a pair of second gear members 7 (FIG. 4).

Specifically, the platform 1 has a top surface to receive the items thereon and defines a generally U-shaped depression 10 configured and sized for accommodating the handle assembly 4 when the latter is in its horizontal position as shown in FIG. 2. The wheel-connecting bars 2 are rotatably attached to a bottom of the platform 1 by means of attachment members 12. As shown in FIG. 3 or 4, the wheels 3 are affixed to the wheel-connecting bars 2 and therefore are rotatable with the latter at the same time. The handle assembly 4 has an upper substantially U-shaped handle portion 40 and a pair of lower vertical frame members 41. The upper handle portion 40 has a pair of handle arms 42 telescopically attached in the lower vertical frame members 41 and a central grip 43 joining the handle arms 43. Moreover, the handle assembly 4 has at least one horizontal frame member 44 supporting the vertical frame members 41 and a pair of inner guiding rods 45 (see FIG. 4) each disposed in the respective vertical frame member 41.

Figure 6:
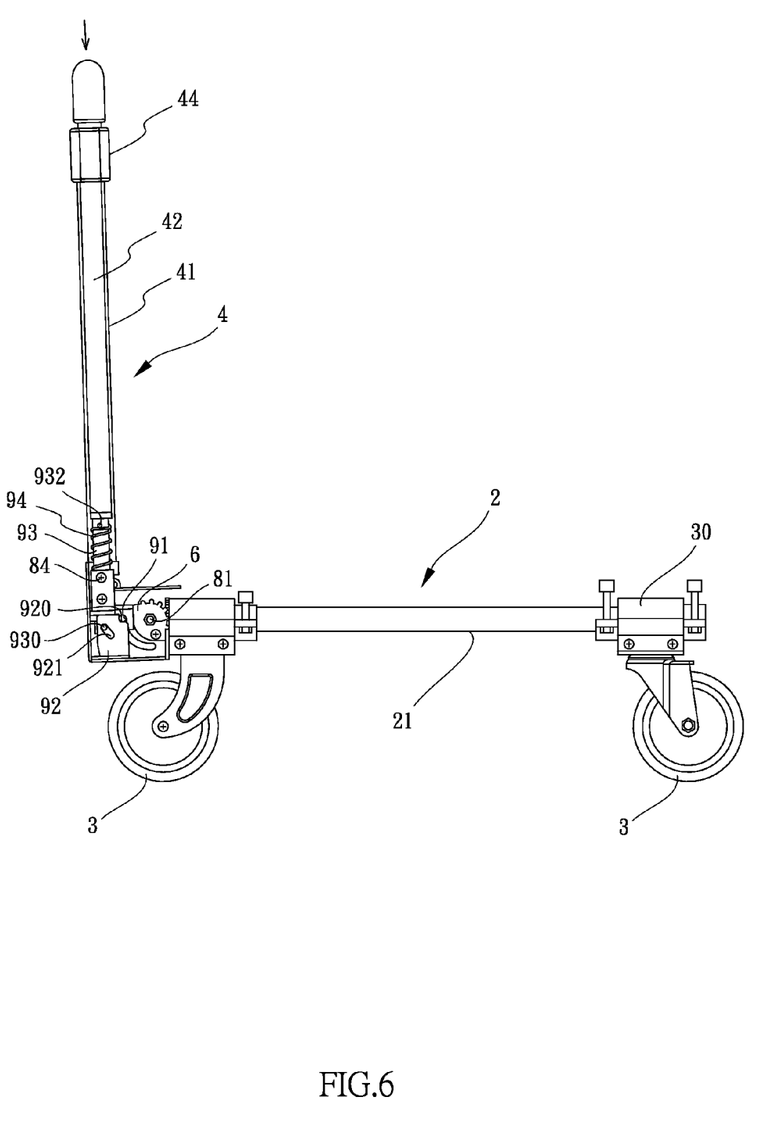
FIG. 6 is a fragmented side view of the platform truck showing the handle assembly in its upright, retracted and locked position.
Figure 7:
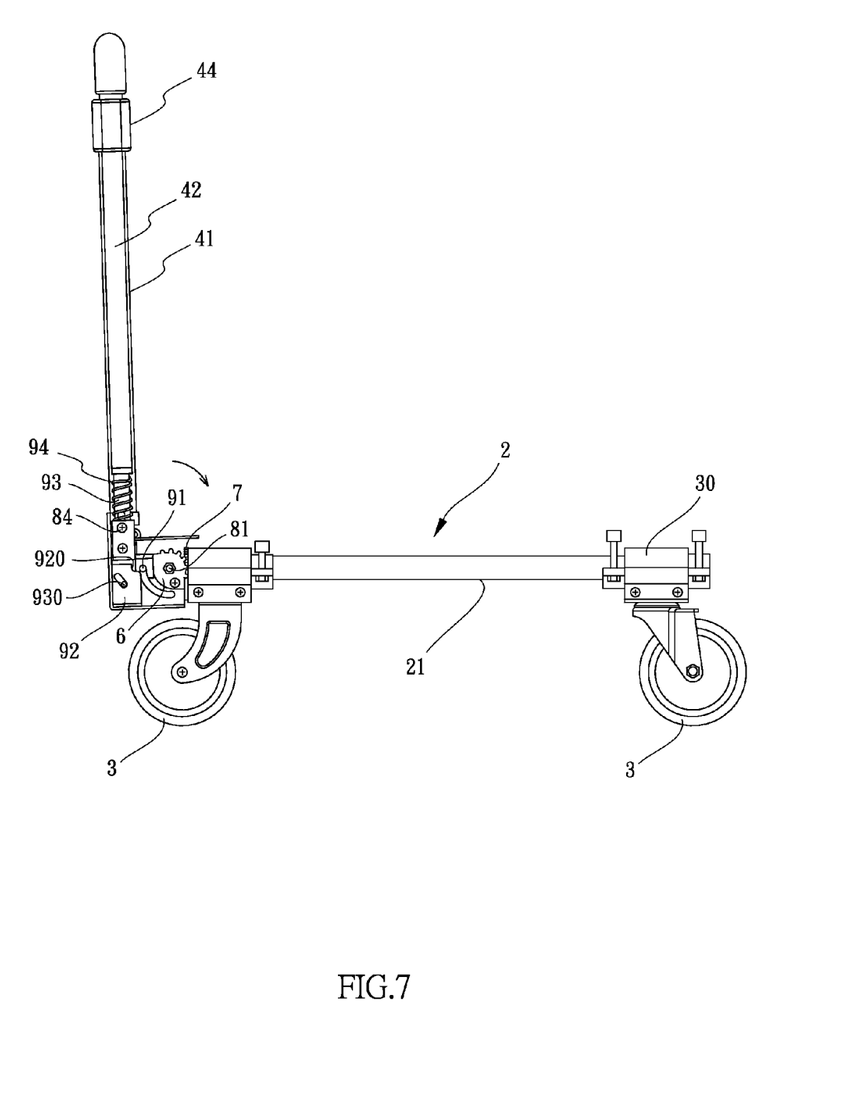
FIG. 7 is a view similar to FIG. 6 of the platform truck showing the handle assembly having been moved from the position shown in FIG. 6 to an unlocking position so that it can be pivoted to the horizontal position shown in FIG. 2.
Figure 8:
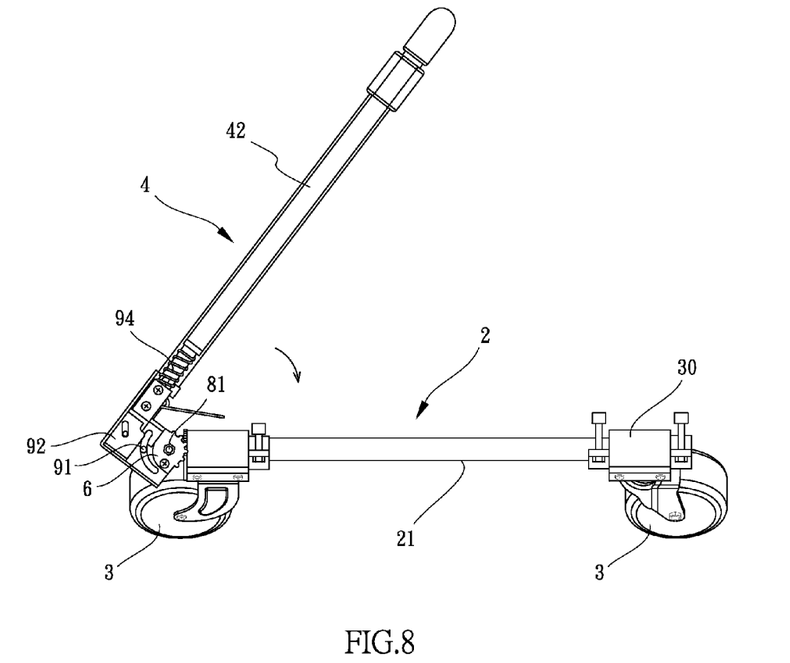
FIG. 8 is a view similar to FIG. 7 of the platform truck showing the handle assembly being pivoted from the position shown in FIG. 7 toward the horizontal position.

The handle release and locking mechanism 5 is disposed in the handle assembly 4 and has an actuator 50 exposed in the middle of the horizontal frame member 44 of the handle assembly 4. The actuator 50 is configured to be operated to allow the handle arms 42 together with the central grip 43 to displace with respect to the vertical frame members 41 among a first extended locking position (FIG. 1), a second retracted locking position (FIG. 6), and a third retracted unlocking position (FIG. 7). In particular, when the U-shaped handle portion 40 is in the third retracted position, the handle assembly 4 is unlocked by a pair of self-locking mechanisms 9, as will be described in detail later, and allowed to pivot between a generally upright position (FIG. 6) and a generally horizontal position (FIG. 9) generally flush with the top surface of the platform 1.

More specifically, the actuator 50 of the handle release and locking mechanism 5 is configured to be depressed towards a position that is substantially contiguous with a surface of the horizontal frame member 44, which unlocks the handle arms 41 so that the handle arms 42 are allowed to be moved among the first extended locking position (FIG. 1), the second retracted locking position (FIG. 6) and the third retracted unlocking position (FIG. 7). Upon release, the actuator 50 will be restored back to its original position and locks the handle arms 42 in either the first extended locking position or the second retracted locking position. It is noted that the actuator 50 could not be released in the third retracted unlocking position.

Referring to FIG. 3, there are two pivot brackets 8 and two respective pivot pins 81 employed in the platform truck 100 for connection of the handle assembly 4 and the wheel-connecting bars 2. Each of the pivot brackets 8 has one end secured to a respective one of the vertical frame members 41 of the handle assembly 4 by means of connecting bolts 84, and the other end pivotally connected to a respective one of the wheel-connecting bars 2 by means of a respective one of the pivot pins 81. As seen in the drawing, each of the pivot brackets 8 has a pair of parallel mounting plates 80 that define opposed pivot holes 82 respectively for accommodating the pivot pin 81 therebetween.

As shown in FIG. 3, the first gear members 6 are connected to the handle assembly 4 via the pivot brackets 8. Specifically, the first gear members 6 are mounted to the outer sides of the pivot brackets 8 by the pivot pins 81 respectively. Referring to FIG. 4, the second gear members 7 are provided to mesh with the first gear members 6 and secured to the wheel-connecting bars 2 via four wheel brackets 30 which holds the wheels 3 onto the wheel-connecting bars 2. As a result of the engagement of the first gear members 6 and the second gear members 7, the pivotal movement of the handle assembly 4 with respect to the platform 1 will cause rotation of the wheel-connecting bars 2 as well as the wheels 3.

Figure 9:
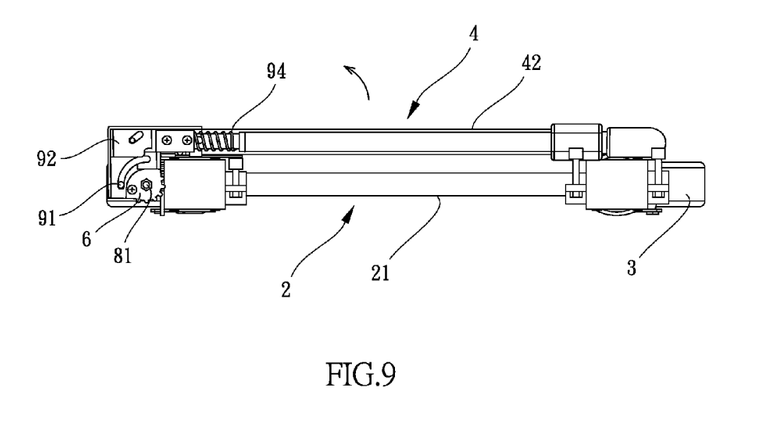
FIG. 9 is a view similar to FIG. 8 of the platform truck showing the handle assembly in the horizontal position.

As shown in FIG. 2 and referring to FIG. 9, when the handle assembly 4 is in the horizontal position, the wheels 3 are folded up underneath the platform 1 and lie horizontally with respect thereto. However, when the handle assembly 4 is pulled away from the platform 2 to the upright position, the first gear members 6 engage and turn the second gear members 7, resulting in the wheel-connecting bars 2 rotating to fold out the wheels 3 from underneath the platform 1 toward an eventual perpendicular position with respect to the underside of the platform 1, as shown in FIG. 6.

Figure 5:
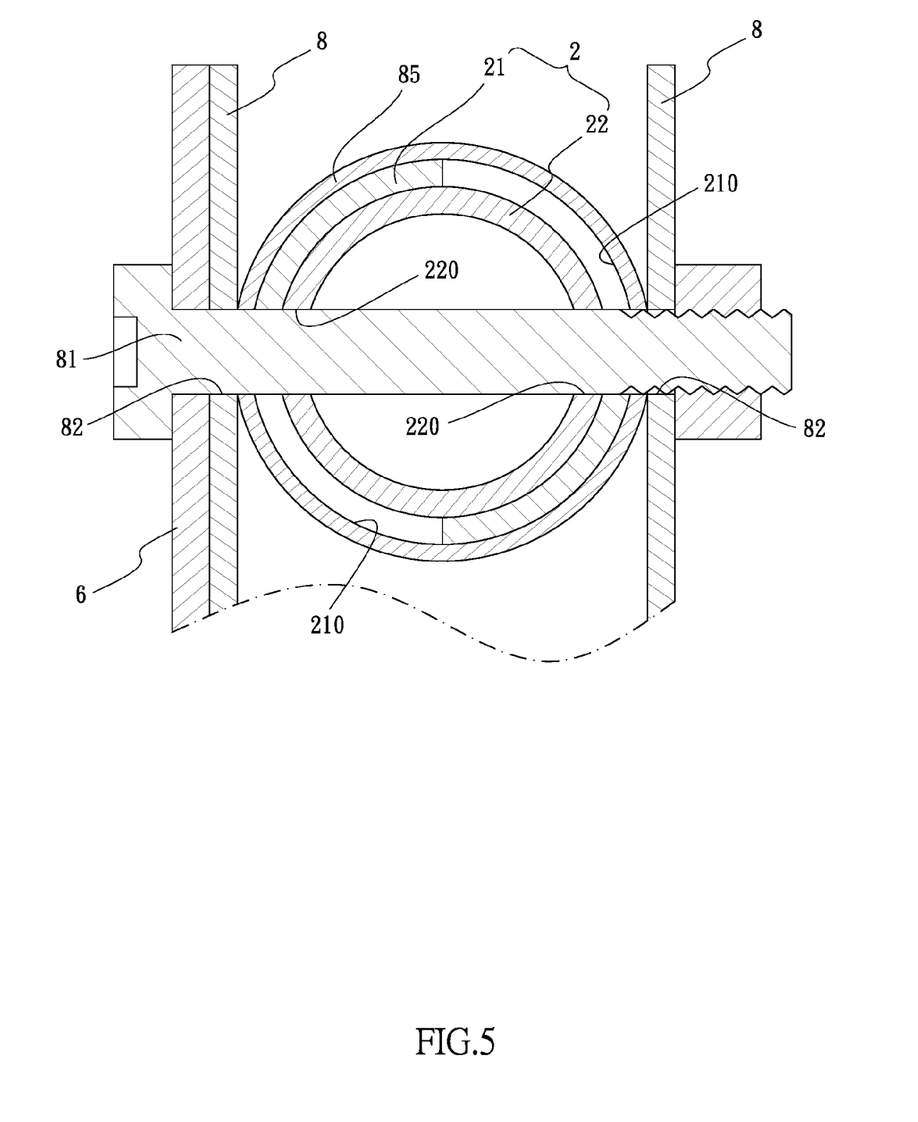
FIG. 5 is a cross section of the wheel-connecting rods of the platform truck of FIG. 3 taken along the line V-V in FIG. 3.

Referring back to FIG. 4, each of the wheel-connecting bars 4 includes an outer tube 21 and an inner tube 22 inserted in a front end of the outer tube 21. As illustrated in FIG. 5, the inner and outer tubes 21, 22 are made of metal and enclosed by a plastic bushing 85. The outer tube 21 defines at its front end a pair of opposed arc-shaped slots 210 in a periphery thereof. The second gear members 7 are mounted around the respective front ends of the outer tubes 21 of the wheel-connecting bars 4. The inner tube 22 defines a pair of opposed pivot bores 220 in a periphery thereof. Each of the pivot pins 81 is secured on the respective pivot bracket 8 and passes through the opposed arc-shaped slots 210 of the outer tube 21 and the opposed pivot bores 220 of the inner tube 22 in such a manner that the outer tube 21 is rotatable in a range of about 90 degrees with respect to the inner tube 21 which is stationary when the handle assembly 4 is pivoted.

Figure 4A:
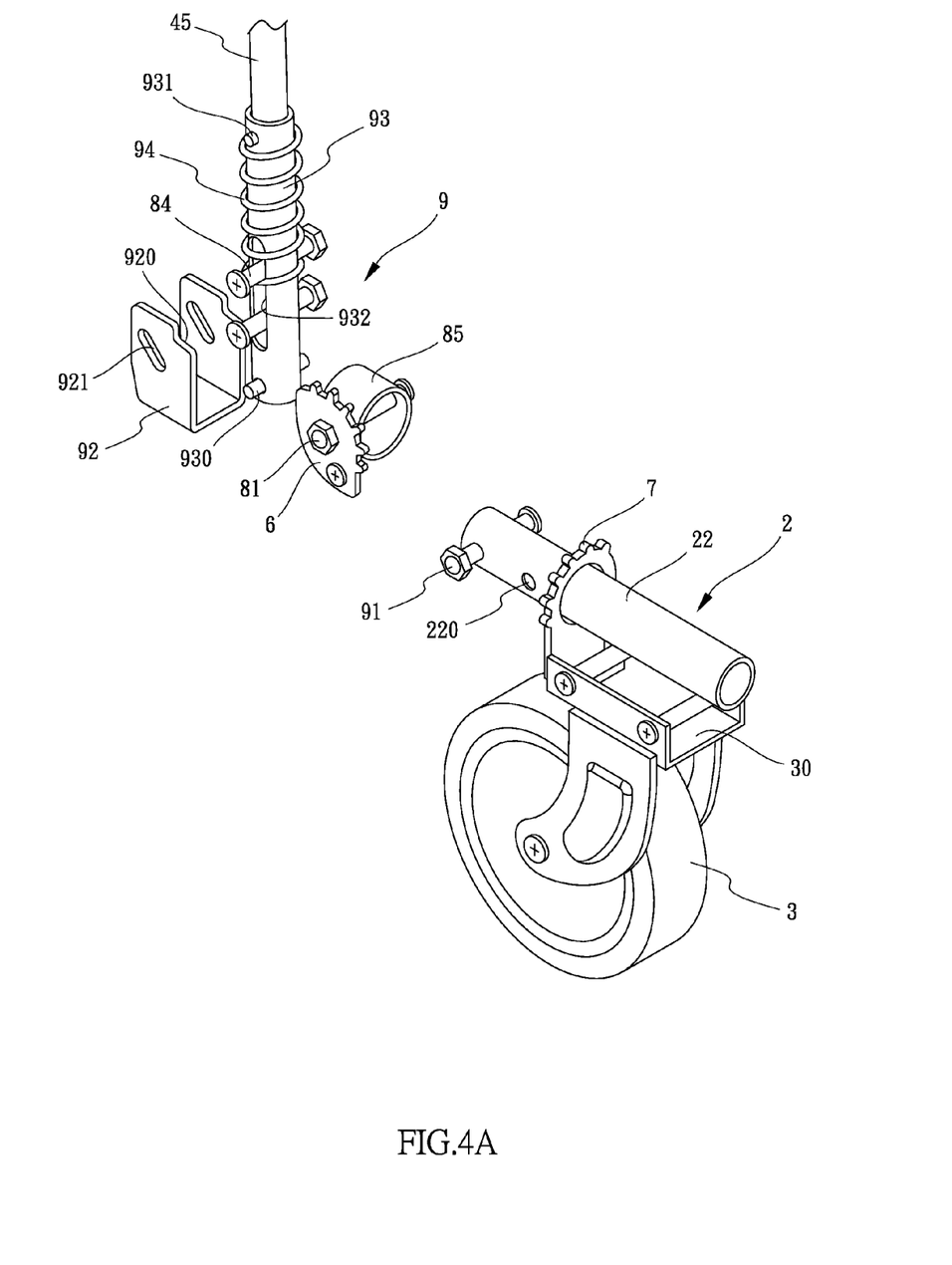
FIG. 4A is a partially enlarged view of the platform truck in FIG. 4.

Referring to FIGS. 4 and 4A, there are two self-locking mechanisms 9 employed to stabilize the platform truck 100 and, therefore the platform truck 100 is able to handle heavy and large loads without being damaged and with ease and assurance. Each of the self-locking mechanisms 9 includes a limiting bolt 91 traversely passing across a front end of the inner tube 22, a substantially U-shaped locking bracket 92 disposed in a corner of the pivot bracket 8 and underneath the respective vertical frame member 41, a driving tube 93 seated in the locking bracket 92, and a coil spring 94 mounted around the driving tube 93 to be pressed by the respective handle arm 42, as shown in FIG. 7. Note also that, the limiting bolt 91 is, on the other hand, cross-mounted in a pair of opposed arc-shaped slots 83 defined in the mounting plates 80 of the pivot bracket 8. When the handle arms 42 of the handle assembly 4 are in the second retracted locking position, as shown in FIG. 6, the locking bracket 92 engages with the limiting bolt 91 to stop the handle assembly 4 from pivoting. However, when the handle arms 42 move from the second retracted locking position (FIG. 6) to the third retracted unlocking position (FIG. 7), the driving tube 93 drives the locking bracket (92) to disengage with the limiting bolt 91 so as to allow the handle assembly 4 to pivot between the upright position (FIG. 7) and the horizontal position (FIG. 9). In other words, in order to pivot the handle assembly 4 about the pivot pins 81, the upper handle portion 40 of the handle assembly 4 will have to be pushed downward firstly, as shown in FIG. 7 to release the handle assembly 4. Then the handle assembly 4 can be pivoted and finally to the horizontal position with respect to the platform 1, as shown in FIG. 9.

More specifically, the driving tube 93 is formed with a pair of studs 930 on opposite sides thereof. The substantially U-shaped locking bracket 92 has a pair of inclined slots 921 for accommodating the studs 930 of the driving tube 93 and a pair of confining notches 920 at its upper corners for reception of opposite ends of the limiting bolt 91. As such, vertical movement of the driving tube 93 can cause the locking bracket 92 to move horizontally, as depicted in FIGS. 6 and 7.

It is also noted that the driving tube 93 together with the pivot bracket 8 and the vertical frame member 41 is mounted around a lower end of the guiding rod 45 by the connecting bolts 84. Each of the handle arms 42 is hollow and slidably mounted around the guiding rod 45 in the vertical frame members 41 to push the driving tube 93 in order to have the locking bracket 92 disengaged from the limiting bolt 91 that is situated on the inner tube 22 of the wheel-connecting bar 2. In this embodiment, the driving tube 93 is formed with a protrusion 931 on a side. The driving tube 93 defines a pair of opposed axial elongated slots 932 for insertion of the respective connecting bolt 84. The coil spring 94 is interposed between the protrusion 931 and the connecting bolt 84. In this manner, when the upper handle 40 is pushed down by a user to have the handle arms 42 in the third retracted unlocking position, the coil springs 94 are pressed by the respective handle arms 42, as depicted in FIG. 7. On the contrary, once the user stops pushing the handle arms and the coil spring 94 is therefore released from the handle arm 42, the driving tube 93 can be automatically drawn back to its original position by the restoring force exerted by the coil spring 94 to have the locking bracket 92 displace to engage again with the limiting bolt 91, as shown in FIG. 6.

As described above, the collapsible platform truck 100 is compact and of small size when collapsed, as shown in FIG. 2 or 9, so that it can be easily and conveniently transported and stored when not in use while at the same time is strong and stable, as shown in FIG. 6 and, therefore, is able to handle heavy and large loads without being damaged and with ease and assurance.

It is to be understood that the disclosed embodiments are illustrative in nature and the invention is not to be limited to any one or more embodiments except as set forth in the following claims.

What is claimed is:

1. A collapsible platform truck comprising:
   a platform;
   a pair of wheel-connecting bars rotatably attached to a bottom of the platform;
   a plurality of wheels connected to the wheel-connecting bars;
   a handle assembly having a pair of lower vertical frame members, a pair of handle arms telescopically attached in the vertical frame members, and a central grip joining the handle arms;
   two respective pivot pins;
   a pair of pivot brackets each having one end secured to a respective one of the vertical frame members, and the other end pivotally connected to a respective one of the wheel-connecting bars by means of a respective one of the pivot pins;
   a handle release and locking mechanism disposed in the handle assembly and having an actuator configured to be operated to allow the handle arms together with the central grip to displace with respect to the vertical frame members among a first extended locking position, a second retracted locking position, and a third retracted unlocking position where the handle assembly is unlocked and allowed to pivot between a generally upright position and a generally horizontal position generally flush with a top surface of the platform;
   a pair of first gear members connected to the handle assembly; and
   a pair of second gear members meshing with the first gear members and connected to the wheel-connecting bars;
   wherein when the handle assembly is in the horizontal position, the wheels are folded up underneath the platform and lie horizontally with respect thereto; and when the handle assembly is pulled away from the platform to the upright position, the first gear members engage and turn the second gear members, resulting in the wheel-connecting bars rotating to fold out the wheels from underneath the platform toward an eventual perpendicular position with respect to the underside of the platform; and
   wherein each of the wheel-connecting bars includes an outer tube and an inner tube inserted in a front end of the outer tube; the outer tube defines at its front end a pair of opposed arc-shaped slots in a periphery thereof; the inner tube defines a pair of opposed pivot bores in a periphery thereof; and each of the pivot pins is secured on the respective pivot bracket and passes through the opposed arc-shaped slots of the outer tube and the opposed pivot bores of the inner tube in such a manner that the outer tube is rotatable in a range of about 90 degrees with respect to the inner tube.

2. The collapsible platform truck of claim 1, wherein the handle assembly further has at least one horizontal frame member supporting the vertical frame members; and the actuator is disposed in the middle of the horizontal frame member and is configured to be depressed towards a position that is substantially contiguous with a surface of the horizontal frame member, which unlocks the handle arms so that the handle arms are allowed to be moved among the first extended locking position, the second retracted locking position and the third retracted unlocking position, and upon release, the actuator is restored back to its original position and locks the handle arms in either the first extended locking position or the second retracted locking position.

3. The collapsible platform truck of claim 1, wherein the first gear members are mounted to outer sides of pivot brackets by the pivot pins respectively; and the second gear members are mounted around the respective front ends of the outer tubes of the wheel-connecting bars.

4. The collapsible platform truck of claim 1, further comprising two self-locking mechanisms each including a limiting bolt traversely passing across a front end of the inner tube, a substantially U-shaped locking bracket disposed in the pivot bracket and underneath the respective vertical frame member, a driving tube seated in the locking bracket; wherein when the handle arms of the handle assembly are in the second retracted locking position, the locking bracket engages with the limiting bolt to stop the handle assembly from pivoting; and when the handle arms move from the second retracted locking position to the third retracted unlocking position, the driving tube drives the locking bracket to disengage with the limiting bolt so as to allow the handle assembly to pivot between the upright position and the horizontal position.

5. The collapsible platform truck of claim 4, wherein the driving tube is formed with a pair of studs on opposite sides thereof; the substantially U-shaped locking bracket has a pair of confining notches for reception of opposite ends of the limiting bolt and a pair of inclined slots for accommodating the studs of the driving tube such that vertical movement of the driving tube causes the locking bracket to move horizontally.

6. The collapsible platform truck of claim 4, wherein each of the pivot brackets has a pair of parallel mounting plates that define opposed pivot holes respectively for accommodating the pivot pin as well as opposed arc-shaped slots for insertion of the limiting bolt.

7. The collapsible platform truck of claim 4, wherein the handle assembly further includes a pair of guiding rods each disposed in the respective vertical frame member; the pivot bracket is joined to a lower end of the respective guiding rod; the driving tube is mounted around the guiding rod; and each of the handle arm is hollow and slidably mounted around the guiding rod to push the driving tube in order to have the locking bracket disengaged from the limiting bolt.

8. The collapsible platform truck of claim 4, wherein each of the self-locking mechanisms further includes a coil spring mounted around the driving tube to be pressed by the respective handle arm as the handle arm is in the third retracted unlocking position; and when the coil spring is released from the handle arm, the driving tube is drawn back to its original position by the coil spring to have the locking bracket rejoin with the limiting bolt.

9. The collapsible platform truck of claim 8, further comprising at least two connecting bolts each for connecting the vertical frame member of the handle assembly, the driving tube and the pivot bracket, wherein the driving tube is formed with a protrusion on a side; the driving tube defines a pair of opposed axial elongated slots for insertion of the connecting bolt; and the coil spring is interposed between the protrusion and the connecting bolt.

10. The collapsible platform truck of claim 8, wherein the platform defines in its top surface a generally U-shaped depression for accommodation of the handle assembly.

* * * * *